March 7, 1950 M. F. HARRISON 2,499,582
COMBINED SAFETY GUARD AND DUST COLLECTOR
Filed Dec. 12, 1945
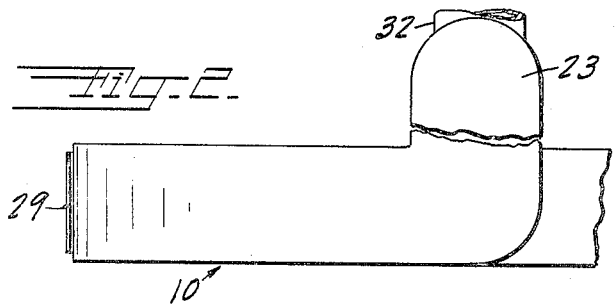
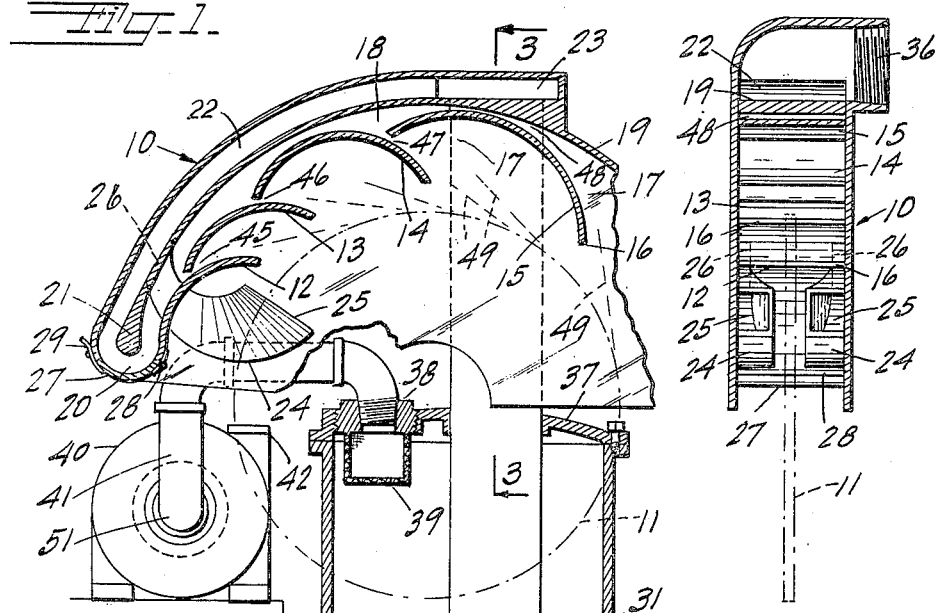
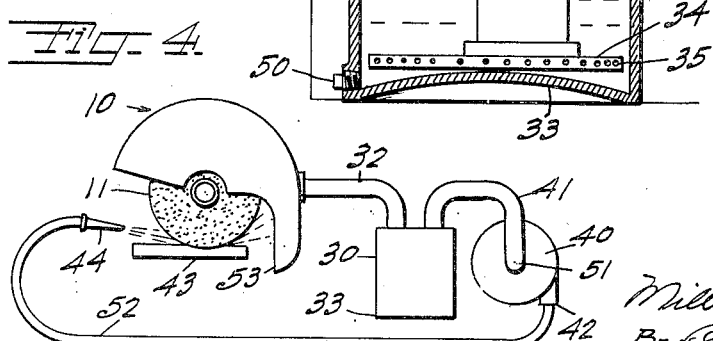
Inventor
Millard F. Harrison
By Philip A. Friedell
Attorney Patented Mar. 7, 1950

2,499,582

UNITED STATES PATENT OFFICE 2,499,582

COMBINED SAFETY GUARD AND DUST COLLECTOR

Millard F. Harrison, Oakland, Calif.

Application December 12, 1945, Serial No. 634,593

2 Claims. (Cl. 51—273)

This invention, a combined safety guard and dust collector provides in a single unit a guard for cutting wheels and a collector for the cuttings. It keeps the air around the operator free of dust and cuttings, thereby, while providing the protection against injury provided by the conventional guard, it additionally provides protection of the health of the operator by eliminating the dust before it can reach the surrounding air, and it can, when desired, additionally be arranged to keep the work clean as the operation progresses.

The invention is equally suitable for saws of either the toothed metal type, the embedded type, or the abrasive type such as Carborundum and allied materials, and likewise for dry-grinding wheels.

When plastics and other synthetic products are sawed or otherwise cut to form or size, various types of abrasive wheels are used for performing the cutting, and these wheels, operating at high speed, carry considerable of the dust far enough around the wheel to cast it directly toward the operator, and in some cases the air becomes heavily loaded with dust to be breathed by the operator. This dust is detrimental to the health of the operator and others within its range, and though dust collectors are known which are supposed to eliminate this dust, their effectiveness is considerably below the level desired.

This invention, depending upon the type of equipment with which it is used, will in all cases prevent any dust from being cast toward the operator, and where installation permits, it can be arranged to collect all dust formed by the cutting wheel and dispose of it in a manner in which it can no further contaminate the air, and while doing so, it can be arranged to keep the work free of the dust or cuttings.

The objects and advantages of the invention are as follows:

First, to provide a combined safety guard and dust collector for high-speed cutting wheels.

Second, to provide a dust collector which will effectively catch and collect all dust cast off toward the operator by a high-speed cutting wheel.

Third, to provide a dust collector with which all dust cast by the cutting wheel can be caught and collected.

Fourth, to provide a dust collector as outlined which can be arranged to keep the work clean while simultaneously catching and collecting the dust.

Fifth, to provide a dust collector as outlined which simultaneously functions as a safety guard for the cutting wheel.

In describing the invention reference will be made to the accompanying drawings in which:

Fig. 1 is a vertical section through the invention, showing both the dust catching and dust collecting means arranged for catching and collecting only the dust which would be cast toward the operator.

Fig. 2 is a top plan view of Fig. 1.

Fig. 3 is a vertical transverse section through the invention taken on line 3—3 of Fig. 2 but with the suction connection modified for remote location of the dust collector.

Fig. 4 diagrammatically illustrates a complete unit for guarding the wheel, catching and collecting all dust, and keeping the work clean as the cutting progresses.

The invention consists of the safety guard 10 for guarding the saw or abrasive wheel 11, in connection with dust-catching elements, a dust collector, a source of subatmospheric pressure and pressure above atmospheric.

The dust catchers consist of two types, one for catching peripherally-cast dust, and the other for catching dust cast from the side of the wheel. The peripheral catchers may be in the form of louvres, those shown being a modified form of louvre which, as shown consist of curved blades 12, 13, 14 and 15 the approach ends 16 of which flare inwardly toward the saw or grinding wheel leaving a broad gap 17 for catching the cast-off particles, and with the series of blades forming a continuous passage 18 with the guard wall 19 functioning as the opposite wall for the passage.

The passage 18 terminates in a return bend 20 at the lower forward end of the guard, which return bend is formed between the bulbous terminal end 21 of the guard wall 19 and the terminal louvre 12 which curves about this bulbous end 21 and extends about and over the top of the wall 19 to form a suction passage 22, the passage 22 terminating in a connection 23 for a suction conduit.

The side dust catchers consist each of a horn-like member 24 which is open at 25 to receive the dust cast off from the side of the wheel, and one of these catchers is provided for each side of the wheel, though not limited to one since in certain cases it might be desirable to use two or more in series. These side dust catchers terminate in restricted passages opening into the suction passage 22 through the wall 19 as indicated at 26.

A suitable clean-out opening is provided at the return bend and this opening is provided with a suitable self-sealing cover 27 which is hinged at 28 and provided with a suitable lock or latch 29.

The dust collecting means consists of an air-tight receiver 30 which is partly filled with liquid such as water 31 and a suction conduit 32 which extends substantially to the bottom 33 of the receiver and terminates in an air-dispersing shoe 34 which is provided with a multiplicity of tiny passages 35, the upper end of the conduit being connected to the connection 23 or 36, the conduit being formed integral with or sealed through the cover 37 of the receiver.

A suction outlet 38 is removably secured in the cover 37 and is provided with a bubble or foam breaker such as a screen 39 and is connected to a vacuum pump 40 through a conduit 41, the discharge 42 of this pump being available for blowing the dust or cuttings off of the work 43 as through a nozzle 44.

As diagrammatically illustrated in Fig. 4, the vacuum pump 40 draws air through the suction line 41, thence through the liquid 31 in the receiver and suction line 32, passage 22 and thence through the passages 25, 45, 46, 47 and 48, all of which passages have equal cross-sectional areas, and the total of which areas is equal to the area of the passage 22, to maintain uniform velocity of the air in all parts of the system, so as not to favor settling out of any dust.

As the wheel 11 rotates at high speed, it carries particles around which are cast off as indicated at 49 and these particles are cast into the gaps 17, and at the same time the increasing suction draws the particles through the passages 25 and 45 to 48 and thence through the passage 22 and conduit 32 to the bottom of the body of liquid 31 where it is dispersed into the liquid through the passages 35, bubbling up through the liquid to the space above the liquid where the velocity is very greatly reduced, the solids remaining in the liquid where they settle to the bottom and where the resultant sludge can be drawn off through the passage closed by the plug 50, at will, the air above the liquid then being drawn up through the screen 39 thence through the conduit 41 to the intake 51 of the compressor 40, and discharged through the conduit 52 through a suitable nozzle 44 over any desired area, such as over the work 43.

Where the complete assembly including blower is used, the guard and collector should extend about the back of the wheel as far as possible, as indicated in Fig. 4, to catch the dust and particles blown by the nozzle 44, the guard having a lip 53 into which the dust is blown.

It will be noted that the vacuum pump pumps only clean air, unlike those which operate in conjunction with a dry separator such as the conventional cyclone type, or those which discharge directly to the outside of a building, therefore the pump is not subjected to any abrasive action. Obviously, a conventional suction fan can be substituted for the vacuum pump shown and may under certain circumstances prove more desirable.

I claim:

1. In a machine having a cutting wheel; a safety guard having a suction passage, and a plurality of dust intercepting members within said guard, and a source of sub-atmospheric pressure for said suction passage; said dust intercepting members comprising a series of louvre type concave members mounted within said guard and having the approach ends in slightly retracted relation to a tangent extending from the rim of the wheel and forming wide gaps therebetween and each terminating at the other end in slightly spaced relation to the back wall of the next member and intermediate its length to form a restricted passage, and with the curved walls and the gaps formed therebetween intercepting and directing dust to said restricted passages, and an air passage having one wall formed by said members and the other walls formed by the walls of said guard, and with said air passage in communication with said suction passage; and side dust catchers mounted in slightly spaced relation to the respective sides of the wheel for catching dust particles thrown off from the side faces of the wheel and each terminating in a restricted passage in communication with said air passage and having a dust intercepting opening extending from a point intermediate the diameter to a point beyond the periphery of the wheel; the area of said suction passage being substantially equal to the combined areas of all of said restricted passages, and said air passage at any point having an area substantially equal to the combined areas of the restricted passages entering up to that point for uniform suction through all of the restricted passages and for minimization of dust gathering and settling in said air and suction passages.

2. In a safety guard for a grinding wheel or the like; a series of concave louvre-type dust interceptors mounted within said guard and each terminating at its inner end in slightly spaced relation to the back wall of the next interceptor and intermediate the length thereof and forming dust-intercepting gaps terminating in restricted passages between the inner terminal ends and the back of the respective interceptors, and a suction passage formed by the inner portions of the back walls of the interceptors and the side and peripheral walls of the guard, and side dust interceptors mounted on the inside of the side walls of said guard and terminating each in a restricted passage opening into said suction passage forwardly of the last of said dust intercepting gaps and having an opening extending from a point intermediate the radius of the grinding wheel to a point beyond the periphery thereof, and with the area of said suction passage at any point being substantially equal to the combined areas of the restricted passages entering up to that point for uniform suction through all of the restricted passages and to prevent accumulation of dust throughout the length of the suction passage.

MILLARD F. HARRISON.

REFERENCES CITED

The following references are of record in the file of this patent:

UNITED STATES PATENTS

| Number | Name | Date |
|---|---|---|
| 790,943 | Weber | May 30, 1905 |
| 807,530 | Yuerhs | Dec. 19, 1905 |
| 956,762 | Furrow | May 3, 1910 |
| 1,174,659 | Bilicki | Mar. 7, 1916 |
| 1,483,966 | Collins | Feb. 19, 1924 |
| 1,722,853 | Morris | July 30, 1929 |
| 1,912,660 | Sequi | June 6, 1933 |

FOREIGN PATENTS

| Number | Country | Date |
|---|---|---|
| 564,675 | France | Oct. 27, 1923 |
| 13,028 | Sweden | Apr. 12, 1901 |